United States Patent [19]

Peters

[11] Patent Number: 5,025,340

[45] Date of Patent: Jun. 18, 1991

[54] ROTARY CHUCK FOR CENTERING AND RETAINING DATA DISCS

[76] Inventor: Roger Peters, 2260 American Ave., Hayward, Calif. 94545

[21] Appl. No.: 421,754

[22] Filed: Oct. 16, 1989

[51] Int. Cl.$^5$ .............................................. G11B 17/08
[52] U.S. Cl. .......................... 360/99.120; 360/99.050; 369/270
[58] Field of Search ................. 360/99.12, 98.8, 99.05; 369/270, 271

[56] References Cited

U.S. PATENT DOCUMENTS

| | | | |
|---|---|---|---|
| 4,390,979 | 6/1983 | Saito et al. | 369/270 |
| 4,562,570 | 12/1985 | Denton | 369/270 |
| 4,881,745 | 11/1989 | Peters | 369/271 X |
| 4,898,397 | 2/1990 | Smith | 360/99.12 X |

FOREIGN PATENT DOCUMENTS

| | | | |
|---|---|---|---|
| 61-253663 | 11/1986 | Japan | 369/270 |
| 62-248159 | 10/1987 | Japan | 369/270 |
| 1365114 | 1/1988 | U.S.S.R. | 369/270 |

Primary Examiner—John H. Wolff
Attorney, Agent, or Firm—Harris Zimmerman

[57] ABSTRACT

A chuck adapted for releasably securing data discs and the like for processing and testing procedures includes an arbor secured at its proximal end to a rotatable tool, and a cylindrical bore within the arbor houses a reciprocating piston. A spring within the bore biases the piston proximally, and a piston rod extends through an aperture in the distal end of the arbor. The distal end of the arbor includes a neck portion extending axially and distally and dimensioned to extend through the central aperture of a data disc, and an annular land surface extending about the neck portion to impinge upon the disc surface adjacent to the central aperture thereof. A resilient bushing is secured coaxially to the distal end of the piston rod, the bushing having a truncated conical configuration tapering toward the distal end. The proximal end of the bushing is dimensioned to be slightly smaller in diameter than the inner diameter of the annular land surface, and is provided with a bevelled outer edge. Air pressure is provided to the proximal side of the piston to drive the piston and piston rod distally, the bevelled edge of the bushing impinging on the end surface of the neck portion of the arbor when the piston is extended distally. When the air pressure is relieved and a disc has been secured about the neck portion of the arbor, the spring force of the spring within the arbor drives the piston and rod proximally, compressing the bushing axially and causing it to deform and spread at its proximal end. The bevelled proximal edge of the deforming bushing wipes radially outwardly onto the inner annular surface of the disc, urging the disc to impinge on the annular land surface of the arbor and securing the disc thereto. The bevelled edge is significant in creating a trailing edge effect which pushes a disc onto the land surface, even if the disc was not originally placed correctly on the land surface.

9 Claims, 3 Drawing Sheets

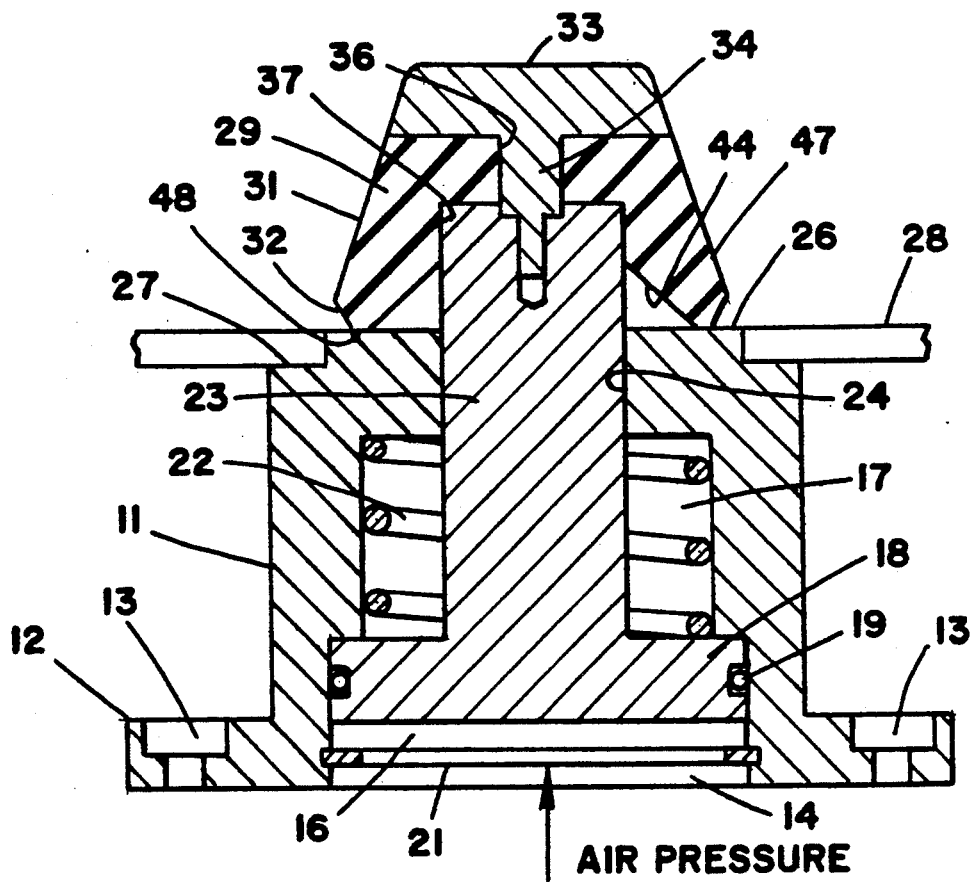
FIG_1
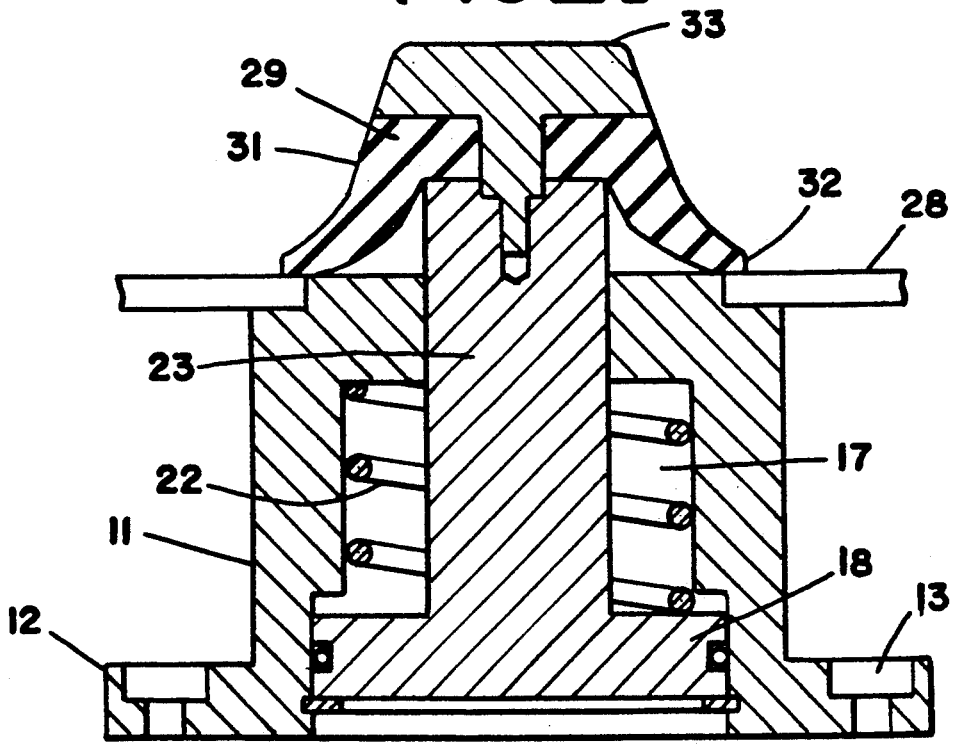
FIG_2

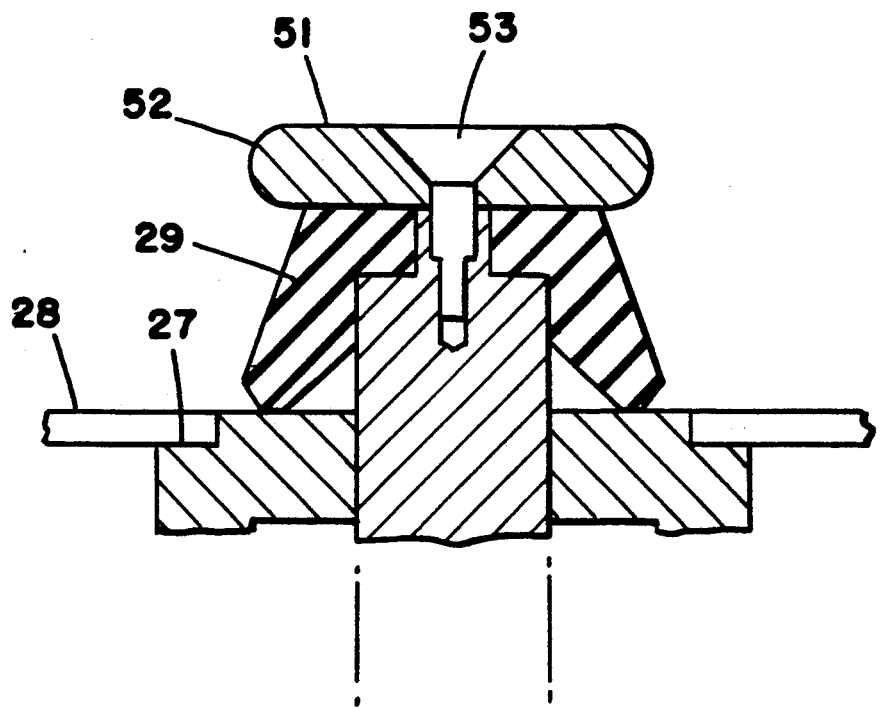
FIG_3
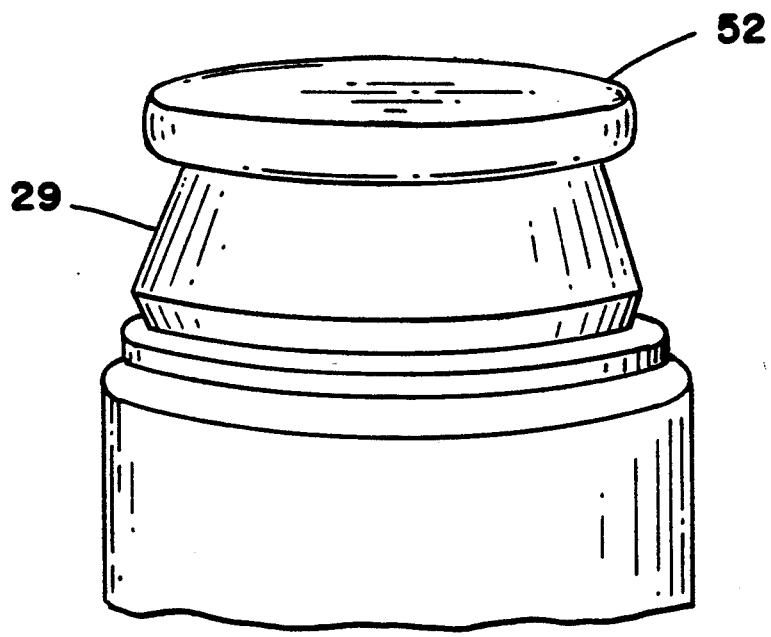
FIG_4

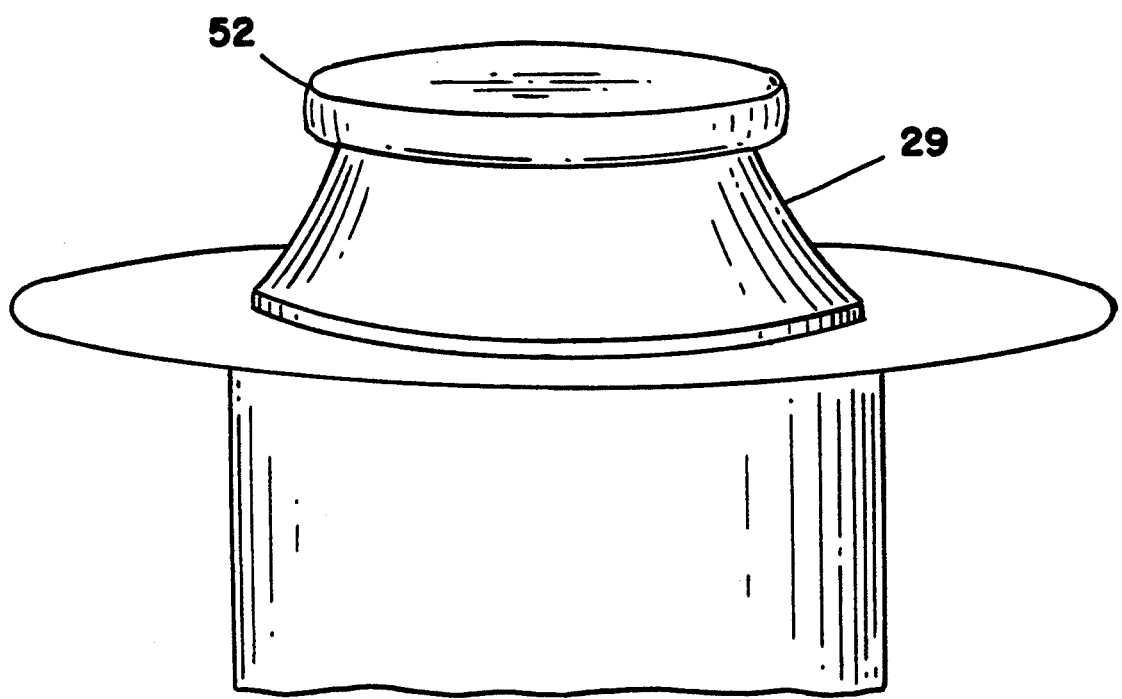
FIG_5

ROTARY CHUCK FOR CENTERING AND RETAINING DATA DISCS

BACKGROUND OF THE INVENTION

This invention relates in general to devices for securing data discs and other record discs in releasable fashion, and more particularly to an apparatus for releasably securing a disc for high speed rotation especially during manufacture and testing.

In the fabrication of data discs, such as rigid "hard" discs used as recording medium in computer disc drives, there are many process steps in which each disc must be secured in releasable fashion to a rotatable arbor. Such process steps may include application of substances to the disc surface, cleaning, polishing, burnishing, and testing. In each of such steps, it is essential that the disc be secured firmly, extending perpendicularly to the axis of the rotating arbor, with virtually no wobble. Generally speaking, the prior art provides various forms of disc chucks adapted for automated operation, so that the placement and removal of the disc on the chuck may be carried out with robotic assitance.

Due to the fact that data discs have extremely fine tolerances for planarity, surface finish, and coating integrity, the devices used to hold the disc during processing must not impart any curvature to the disc and can grip the disc only at surface areas are not used for data recording.

There are some problems common to prior art disc chucks. The chuck may not be adapted to grip a disc that is not perfectly placed thereon. For example, if the robot tool that places the disc on the chuck errs slightly and does not locate the disc firmly on the land surface of the chuck, the typical prior art chuck may fail to grasp the disc, and the disc will be destroyed when the chuck begins to spin. Likewise, if the disc is not aligned perfectly perpendicular to the chuck axis of rotation, the chuck may fail to grip the chuck or may achieve a partial grip, which can also result in destruction of the disc. Furthermore, some chucks exert unequal pressure on the disc and produce curvature of the disc, resulting in an unusable product.

SUMMARY OF THE PRESENT INVENTION

The present invention generally comprises a chuck adapted for releasably securing data discs and the like for processing and testing procedures. The chuck includes an arbor secured at its proximal end to a rotatable tool, and a cylindrical bore within the arbor houses a reciprocating piston. A spring within the bore biases the piston toward the proximal end, and a piston rod extends through an aperture in the distal end of the arbor. The distal end of the arbor includes a neck portion extending axially and distally and dimensioned to extend through the central aperture of a data disc, and an annular land surface extending about the neck portion to impinge upon the disc surface adjacent to the central aperture thereof. A resilient bushing is secured coaxially to the distal end of the piston rod, the bushing having a truncated conical configuration tapering toward the distal end. The proximal end of the bushing is dimensioned to be slightly smaller in diameter than the inner diameter of the annular land surface, and is provided with a bevelled outer edge.

Air pressure is provided to the proximal side of the piston to drive the piston and piston rod distally, the bevelled edge of the bushing impinging on the end surface of the neck portion of the arbor when the piston is extended distally. When the air pressure is relieved and a disc has been secured on the land surface about the neck portion of the arbor, the spring force of the spring within the arbor drives the piston and rod proximally. The proximal motion causes the proximal edge of the bushing to impinge more forcefully on the neck portion, causing the bushing to deform and spread at its proximal end. The bevelled proximal edge of the deforming bushing wipes radially outwardly onto the inner annular surface of the disc, urging the disc to impinge on the annular land surface of the arbor and securing the disc thereto. The bevelled edge is significant in creating a trailing edge effect which pushes a disc onto the land surface, even if the disc was not originally placed correctly on the land surface.

The re-application of air pressure to the proximal side of the piston drives the piston distally once again, causing the bushing to move axially and distally and to resume its quiescent, undistorted shape. The disc is thus released by air pressure. This feature assures that an accidental loss of air pressure cannot cause an accidental release of the disc, an occurrence that could destroy the disc and surrounding equipment and fixtures.

BRIEF DESCRIPTION OF THE DRAWING

FIG. 1 is a cross-sectional elevation of one embodiment of the disc chuck of the present invention, shown in the extended, quiescent disposition.

FIG. 2 is a cross-section elevation as in FIG. 1, showing the disc chuck in the retracted, operative position.

FIG. 3 is a partial cross sectional elevation of a further embodiment of the disc chuck of the present invention, shown in the extended, quiescent disposition.

FIG. 4 is a perspective view of the embodiment depicted in FIG. 3, shown in the extended, quiescent position.

FIG. 5 is a perspective view of the embodiment depicted in FIGS. 3 and 4, shown in the retracted, operative disposition.

DESCRIPTION OF THE PREFERRED EMBODIMENT

The present invention generally comprises a chuck for releasably securing data discs and the like. With reference to FIGS. 1 and 2, one embodiment of the invention includes an arbor 11 having a flange 12 extending radially outwardly from the proximal end thereof. The flange 12 is provided with mounting holes 13 spaced circumferentially thereabout to facilitate securing the flange and the chuck itself to a rotatable tool. The arbor is provided with a bore 14 extending axially therein from the proximal end, the bore 14 being stepped to define a wide outer portion 16 and a narrower inner portion 17.

The chuck includes a piston 18 disposed within the outer bore portion 16, the piston 18 having an O-ring seal 19 to define pressure chambers on either side of the piston. (The inner bore portion 17 may be vented to facilitate the operation described below.) A stop ring 21 is received within an annular groove in the outer bore portion 16 to limit proximal movement of the piston 18. A helical compression spring 22 is received within the inner bore portion 17 and is disposed to exert resilient force on the piston 18 urging the piston proximally. The piston includes a piston rod 23 extending distally therefrom and concentric within the spring 22. At the distal end of the arbor there is provided a coaxial opening 24 through which the piston rod 23 extends in freely translating fashion.

The arbor 11 includes a neck portion 26 extending coaxially from the distal end thereof, the neck portion having a diameter which receives the central aperture of a data disc with close tolerance fit. In the preferred embodiment, which is adapted for use with rigid digital data recording discs, the diameter is approximately 40 mm. However, the invention may be dimensioned to be used with other forms of data recording discs, such as floppy discs, compact discs for audio or digital data recording, and the like. The annular surface 27 extending radially outwardly from the neck portion 26 comprises a land surface against which a data disc 28 may be clamped, the land surface 27 extending perpendicular to the axis of the tool and assuring that the disc 28 extends orthogonally to the axis or rotation.

A salient feature of the present invention is the provision of a resilient bushing 29 secured to the distal end of the piston rod 23. The bushing 29 has the configuration of a truncated cone which tapers toward the distal end of the chuck, and is formed of a resilient material such as rubber, plastic, resin, or the like. A cap member 33 includes a stud 34 having a threaded end which extends through a central bore 36 in the bushing 29 to be engaged in a threaded hole in the distal end of the piston rod 23. The bore 36 is stepped to include a wider medial portion which receives the distal end portion of the piston rod 23. The proximal end portion of the bore 36 includes a flared surface 44 which opens proximally to define a thinned bushing sidewall portion 47 at the proximal end thereof, providing flexibility to the sidewall portion. The bushing also includes a narrow annular surface 48 which impinges on the end surface of the neck portion 26 of the arbor 11. The bushing is configured and dimensioned so that the annular surface 48 is spaced closely adjacent and radially inwardly with respect to the annular land surface 27. Furthermore, it is significant that a bevelled surface extends from the proximal end of the outer conical surface to the annular end surface 48.

In the quiescent or inoperative disposition of the invention, shown in FIG. 1, there is air pressure applied to the proximal side of the piston 18, urging the piston distally against a stop defined by the stepped junction of the bore portions 16 and 17. In this disposition the annular surface 48 of the bushing 29 impinges on the arbor end surface with slight force, and the bushing is maintained in an undeformed condition. To operate the chuck, the air pressure is removed or relieved, and the compressive force of the spring 22 urges the piston proximally against the stop ring 21. The bushing 29 is compressed between the retracting cap member 33 and the end surface of the neck portion 26 of the arbor. The axial compression of the resilient bushing 29 causes radial expansion thereof, and the thin sidewall portion 47 is driven to deform and spread radially outwardly.

As the sidewall portion 47 deforms outwardly, the bevelled surface 32 is driven outwardly from the neck of the arbor onto the inner annulus of the disc 28 placed about the neck portion on the land surface 27. The angle of the bevel of surface 32 creates a wiping action that pushes the disc surface onto the land 27, even if the disc has been positioned initially so that it is not completely flat against the land surface 27. Once the proximal end of the bushing has impinged on the inner annular surface of the disc 28, the compressive force of the bushing clamps the disc tightly against the land surface with an axial force that is applied uniformly about the disc, as shown in FIG. 2. Thus the disc is captured by the bevelled surface and clamped by the bushing in a reliable, non-destructive manner. It should be noted that the clamping action is actuated by relief of the air pressure, so that accidental loss of air pressure cannot result in accidental release of the disc 28.

With regard to FIGS. 3-5, a further embodiment of the invention is similar in most respects to the embodiment depicted in FIGS. 1 and 2, and similar components are shown with the same reference numerals. More specifically, the cap member 33 is replaced by an end plate 51 that includes an outer peripheral surface 52 having a diameter less than the opening in the disc 28 but greater than the distal end of the bushing 29. The outer peripheral surface 52 defines an extra safety factor, in that it will limit the accidental release of a spinning disc 28 if the chuck is accidentally released by operator error. For example, if air pressure is reapplied to the piston while the chuck is rotating, the spinning disc is released. At typical rotation speeds of 300-1000 rpm, the disc could comprise an extremely destructive factor to adjacent instruments and tools. However, the wider peripheral surface 52 tends to capture the accidentally released spinning disc and causes it to spin thereabout while it slows to the point where it is no longer dangerous. As shown in FIGS. 4 and 5, the operation of this embodiment is otherwise the same as the previous embodiment.

I claim:

1. A chuck for releasably retaining a disc having first and second opposite surfaces and a central aperture extending therebetween, said chuck being comprised of:
    an arbor extending along an axis of rotation and having a proximal end and a distal end, said arbor including at its distal end a coaxial neck portion dimensioned to be received through the central aperture of the disc, an annular land surface extending about said neck portion and disposed to receive and seat a portion of said first surface of a disc which is to be retained by said chuck;
    a deformable annular bushing disposed adjacent to said neck portion and being secured to said arbor in coaxial relationship therewith, said bushing having an annular sidewall portion formed of resilient material which expands radially in response to axial compression of said bushing, said bushing further having an annular edge at the periphery of said sidewall portion that contacts said neck portion of said arbor when said bushing is in an uncompressed condition and which edge increases in diameter to overlay and bear against an adjacent annular region of said second disc surface when said bushing is compressed, and
    means for compressing said bushing in the axial direction to expand said annular edge of said bushing radially outward and onto said second surface of said disc thereby clamping said disc against said land surface.

2. The disc chuck of claim 1 wherein said arbor has a chamber therein and an axial passage extending from said chamber towards said distal end of said arbor and wherein said means for compressing said bushing in the axial direction includes a slidable piston in said chamber and a translatable rod extending through said passage that is coupled to said piston and to means for compressing said bushing against said distal end of said arbor in response to movement of said piston and said rod towards said proximal end of said arbor and means for selectively translating said piston which translation means includes a compression spring disposed to urge said piston axially toward said proximal end of said arbor and fluid pressure means for selectively applying fluid pressure to said piston to urge said piston axially toward the distal end of said arbor.

3. The disc chuck of claim 2 wherein said bushing includes a central bore therethrough and wherein said rod extends from said arbor through said bore of said bushing, and wherein said means for compressing said bushing against said distal end of said arbor includes a cap member secured to said rod and extending radially outward therefrom at the end of said bushing that is remote from said annular edge thereof.

4. The disc chuck of claim 3, wherein said cap member is greater in diameter than the proximal end of said bushing while being smaller in diameter than said central aperture of said disc.

5. The disc chuck of claim 3 further including a threaded member extending from said cap member through said central bore to engage said rod.

6. The disc chuck of claim 1, wherein said bushing has a truncated conical configuration tapering toward the distal end thereof.

7. The disc chuck of claim 1, wherein said annular edge of said sidewall portion includes a bevelled surface extending thereabout and defining a wiping surface disposed to engage the inner annular surface of a disc disposed about said neck portion and to urge the disc into impingement with said land surface.

8. The disc chuck of claim 1, wherein said annular sidewall portion of said bushing has a conical outer surface that tapers towards the distal end of the bushing, and wherein said bushing includes an inner peripheral surface extending coaxially with the proximal portion of the conical outer surface of said bushing to define said sidewall portion therebetween, said inner peripheral surface extending in tapering configuration toward the distal end of said bushing.

9. A chuck for releasably retaining a disc having a central aperture, including;
an arbor extending along an axis of rotation and having a proximal end and a distal end, said arbor including at its distal end a coaxial neck portion dimensioned to be received through the central aperture of the disc, an annular land surface extending about said neck portion and disposed to impinge upon a portion of a surface of a disc secured thereto, a resilient, deformable bushing disposed adjacent to said neck portion and secured coaxially to said arbor, said bushing including a sidewall portion having a free proximal annular edge with a diameter slightly less than the central aperture of the disc, means for compressing said bushing in the axial direction to expand said free proximal edge of said bushing radially outwardly to impinge on a disc disposed about said neck portion, including a piston rod extending from the distal end of said arbor, a piston disposed within said arbor and joined to said piston rod, cap means secured to the distal end of said piston rod to compress said bushing as said piston rod translates proximally, said bushing including a truncated conical configuration tapering toward the distal end thereof, and an inner peripheral surface coaxial with the outer conical surface of said bushing and defining therebetween said bushing sidewall portion, and a bevelled edge formed at said free proximal edge of said sidewall portion to define a wiping surface disposed to engage the inner annular surface of a disc disposed about said neck portion and to urge the disc into impingement with said land surface.

* * * * *